US012641489B2

(12) United States Patent
Hong

(10) Patent No.: US 12,641,489 B2
(45) Date of Patent: May 26, 2026

(54) CONTROL INSTRUCTION METHOD AND DEVICE, AND BEHAVIOR CONTROL METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 387 days.

(21) Appl. No.: 18/282,733

(22) PCT Filed: Mar. 22, 2021

(86) PCT No.: PCT/CN2021/082130
§ 371 (c)(1),
(2) Date: Sep. 18, 2023

(87) PCT Pub. No.: WO2022/198398
PCT Pub. Date: Sep. 29, 2022

(65) Prior Publication Data
US 2024/0163728 A1 May 16, 2024

(51) Int. Cl.
*H04W 4/00* (2018.01)
*H04W 28/18* (2009.01)
*H04W 48/16* (2009.01)

(52) U.S. Cl.
CPC ........... *H04W 28/18* (2013.01); *H04W 48/16* (2013.01)

(58) Field of Classification Search
CPC ....... H04W 28/18; H04W 64/00; H04W 4/02; H04W 4/029; H04W 48/18; H04W 48/10; H04W 48/16; H04W 88/069
(Continued)

(56) References Cited

U.S. PATENT DOCUMENTS 6,832,093 B1 * 12/2004 Ranta ................... H04W 48/04
455/565
2011/0096697 A1 * 4/2011 Anantharaman ..... H04W 4/029
370/254
(Continued)

FOREIGN PATENT DOCUMENTS

CN          106257943 A      12/2016
CN          110536012 A      12/2019
EP            2226986 A2       9/2010

OTHER PUBLICATIONS

European Patent Application No. 21932032.2 Search Report dated Dec. 16, 2024, 8 pages.
(Continued)

*Primary Examiner* — Temica M Beamer

(74) *Attorney, Agent, or Firm* — Cozen O'Connor

(57) ABSTRACT

A control instruction method and a behavior control method. The control instruction method includes: sending indication information to a terminal, the indication information being configured to instruct the terminal to control a non-wireless communication behavior corresponding to the indication information based on a control mode corresponding to the indication information. An association relationship between the indication information and the non-wireless communication behavior may be determined by a pre-negotiation between the base station and the terminal, or determined by either of the base station or the terminal and sent in advance.

18 Claims, 7 Drawing Sheets sending indication information to a terminal; in which the indication information is configured to instruct the terminal to control a non-wireless communication behavior corresponding to the indication information based on a control mode corresponding to the indication information

⟿ S101

(58) Field of Classification Search
USPC ......................................................... 370/329
See application file for complete search history.

(56) References Cited

U.S. PATENT DOCUMENTS

2013/0337772 A1     12/2013   Wilson et al.
2016/0003623 A1*    1/2016    Venkatraman  ........  H04W 4/023
                                                                701/410

OTHER PUBLICATIONS

PCT/CN2021/082130, International Search Report dated Dec. 22, 2021, 2 pages.

* cited by examiner

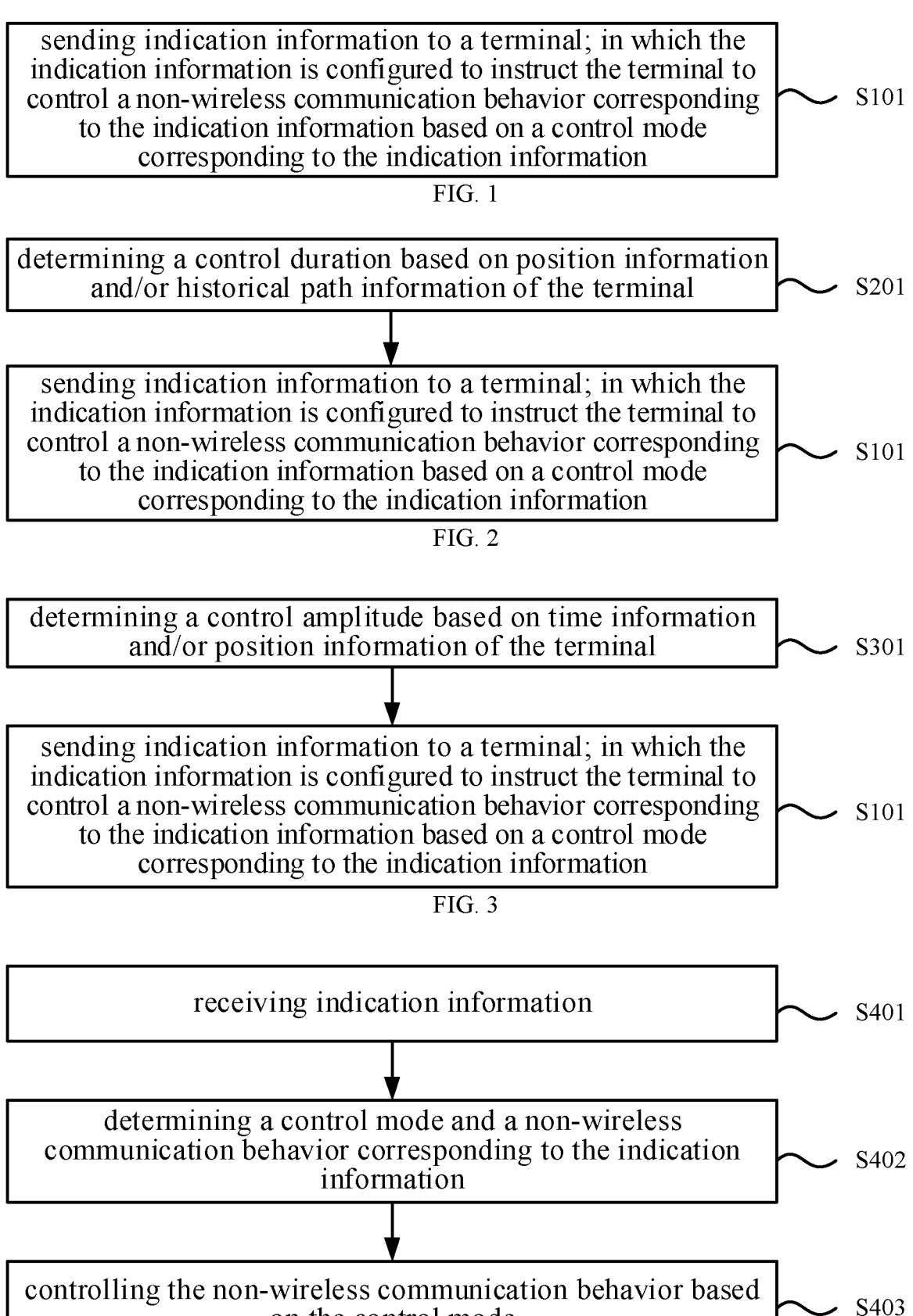

sending indication information to a terminal; in which the indication information is configured to instruct the terminal to control a non-wireless communication behavior corresponding to the indication information based on a control mode corresponding to the indication information ⟿ S101

FIG. 1 determining a control duration based on position information and/or historical path information of the terminal ⟿ S201 sending indication information to a terminal; in which the indication information is configured to instruct the terminal to control a non-wireless communication behavior corresponding to the indication information based on a control mode corresponding to the indication information ⟿ S101

FIG. 2 determining a control amplitude based on time information and/or position information of the terminal ⟿ S301 sending indication information to a terminal; in which the indication information is configured to instruct the terminal to control a non-wireless communication behavior corresponding to the indication information based on a control mode corresponding to the indication information ⟿ S101

FIG. 3 receiving indication information ⟿ S401 determining a control mode and a non-wireless communication behavior corresponding to the indication information ⟿ S402 controlling the non-wireless communication behavior based on the control mode ⟿ S403

FIG. 4

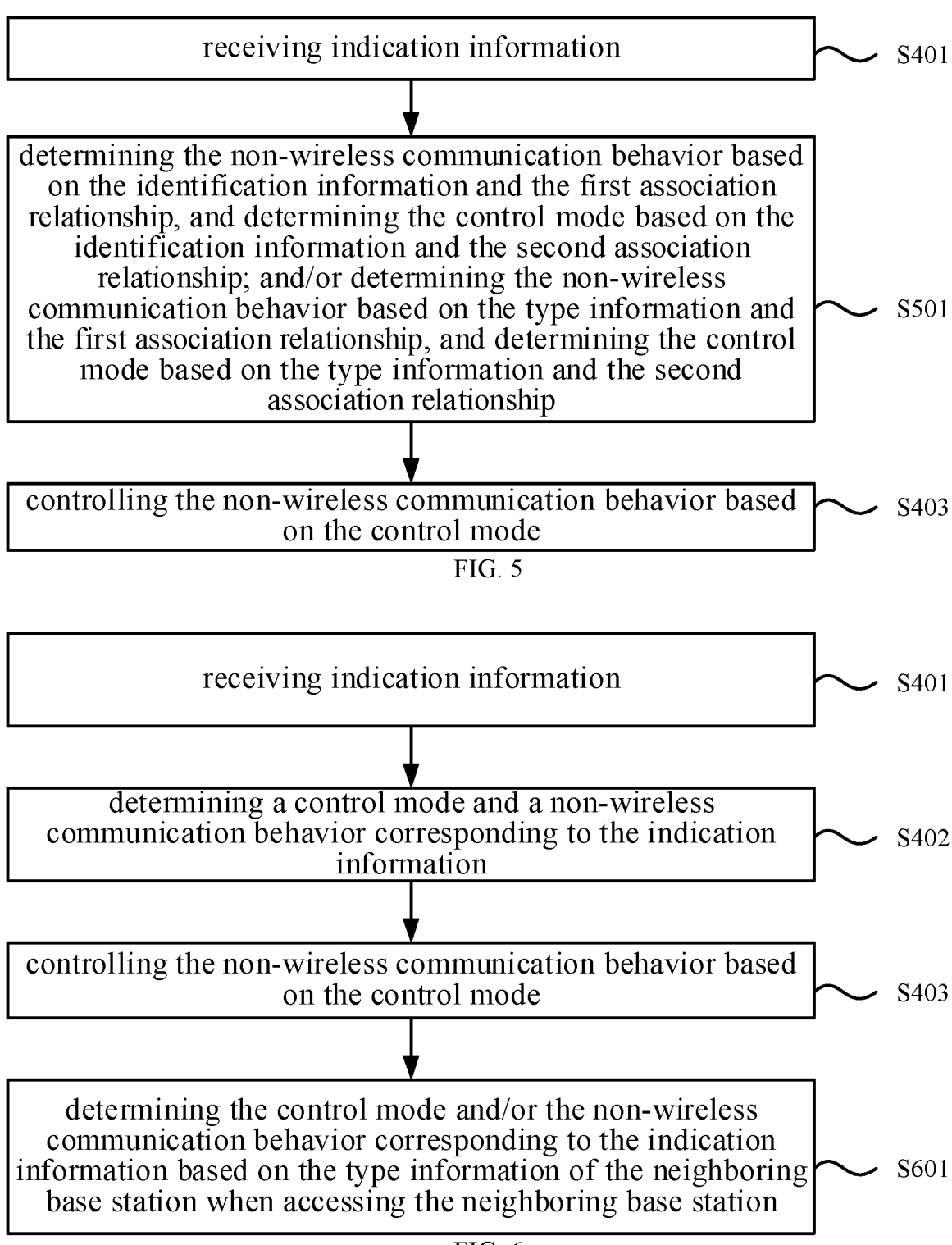

receiving indication information — S401 determining the non-wireless communication behavior based on the identification information and the first association relationship, and determining the control mode based on the identification information and the second association relationship; and/or determining the non-wireless communication behavior based on the type information and the first association relationship, and determining the control mode based on the type information and the second association relationship — S501 controlling the non-wireless communication behavior based on the control mode — S403

FIG. 5 receiving indication information — S401 determining a control mode and a non-wireless communication behavior corresponding to the indication information — S402 controlling the non-wireless communication behavior based on the control mode — S403 determining the control mode and/or the non-wireless communication behavior corresponding to the indication information based on the type information of the neighboring base station when accessing the neighboring base station — S601

FIG. 6

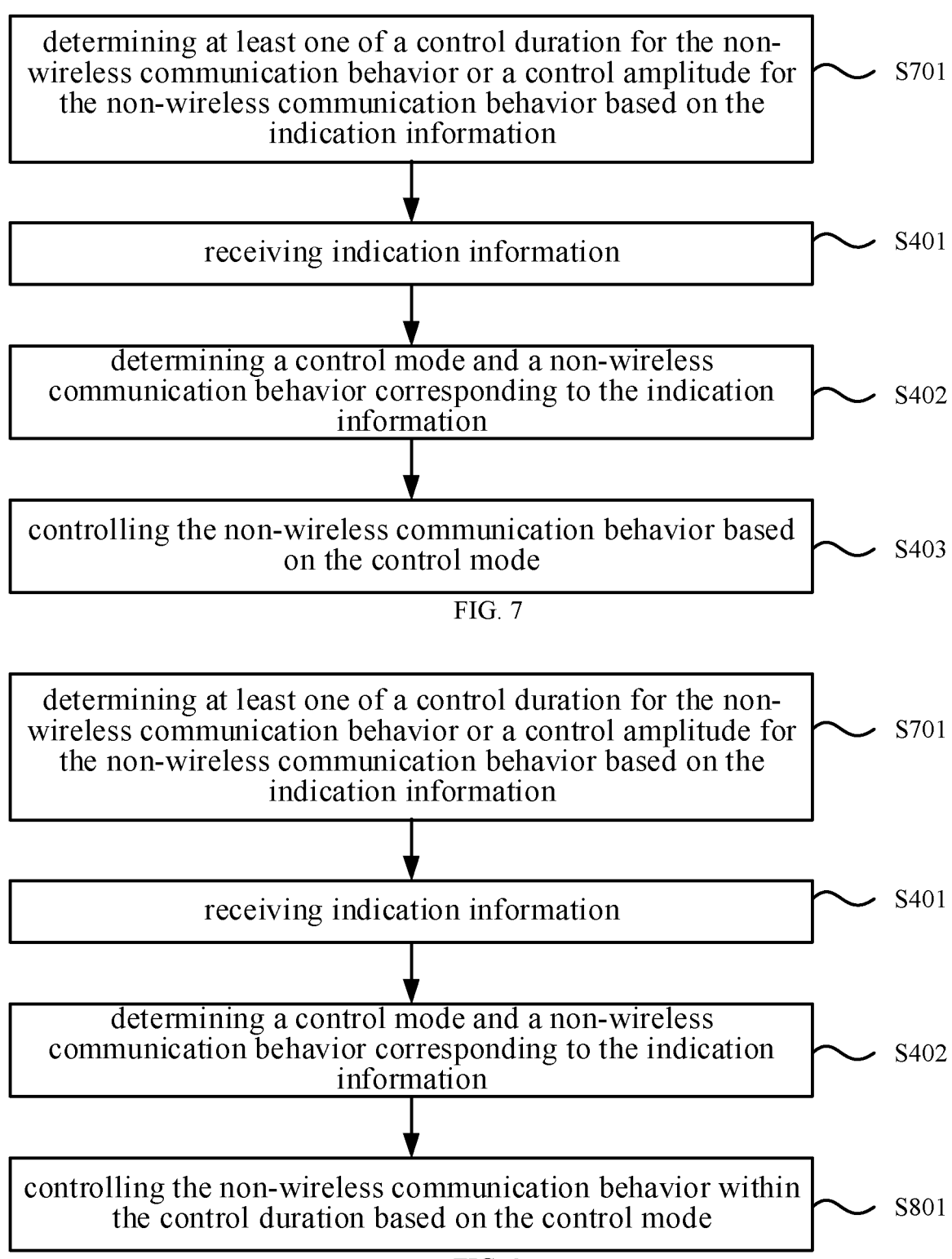

determining at least one of a control duration for the non-wireless communication behavior or a control amplitude for the non-wireless communication behavior based on the indication information ∿ S701 receiving indication information ∿ S401 determining a control mode and a non-wireless communication behavior corresponding to the indication information ∿ S402 controlling the non-wireless communication behavior based on the control mode ∿ S403

FIG. 7 determining at least one of a control duration for the non-wireless communication behavior or a control amplitude for the non-wireless communication behavior based on the indication information ∿ S701 receiving indication information ∿ S401 determining a control mode and a non-wireless communication behavior corresponding to the indication information ∿ S402 controlling the non-wireless communication behavior within the control duration based on the control mode ∿ S801

FIG. 8

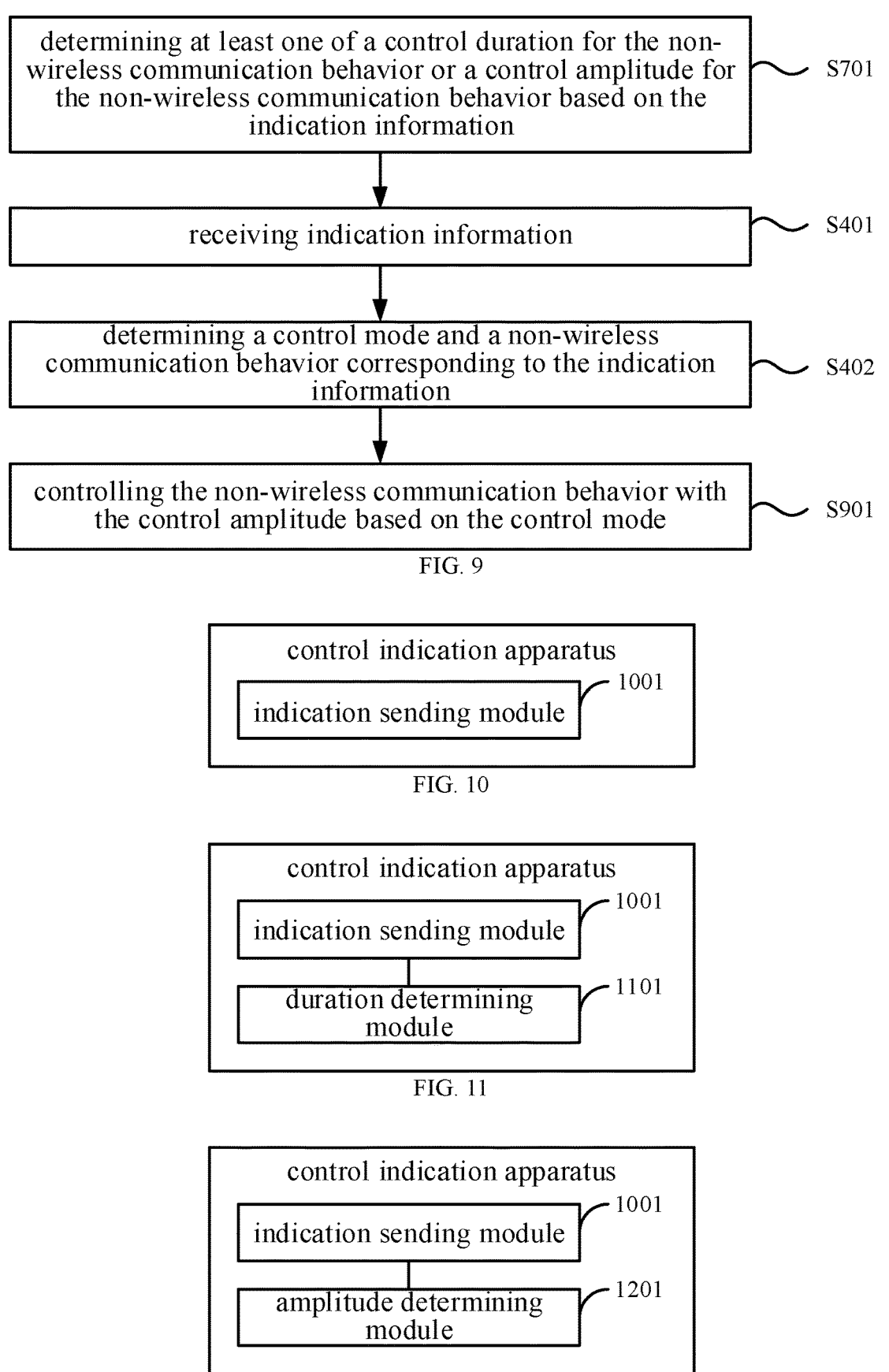

determining at least one of a control duration for the non-wireless communication behavior or a control amplitude for the non-wireless communication behavior based on the indication information   S701 receiving indication information   S401 determining a control mode and a non-wireless communication behavior corresponding to the indication information   S402 controlling the non-wireless communication behavior with the control amplitude based on the control mode   S901

FIG. 9 control indication apparatus indication sending module   1001

FIG. 10 control indication apparatus indication sending module   1001 duration determining module   1101

FIG. 11 control indication apparatus indication sending module   1001 amplitude determining module   1201

FIG. 12

CONTROL INSTRUCTION METHOD AND DEVICE, AND BEHAVIOR CONTROL METHOD AND DEVICE

CROSS-REFERENCE TO RELATED APPLICATION

This application is a U.S. national phase application of International Application No. PCT/CN2021/082130, filed on Mar. 22, 2021, the content of which is hereby incorporated by reference in its entirety.

TECHNICAL FIELD

The disclosure relates to a field of communication technology, and particularly to, a control indication method, a behavior control method, a control indication apparatus, a behavior control apparatus, a communication apparatus, and a computer readable storage medium.

BACKGROUND

For a terminal and a base station in a wireless communication network, the base station may control a wireless communication behavior of the terminal. For example, the base station configures uplink and downlink resources for the terminal, to control the terminal to perform wireless communications with the base station on the configured resources. With development of communication technology, an application range of the terminal becomes more and more extensive. The base station and the terminal may perform wireless communications in various environments.

However, in some environments, certain behaviors of the terminal need to be restricted. At present, most of restrictions are implemented by external anthropogenic interference. Manual monitoring or even manual inspection is required for the anthropogenic interference. On one hand, the labor cost is high, and on the other hand, it is difficult to comprehensively control a behavior that needs to be restricted.

SUMMARY

According to a first aspect of the embodiments of the present disclosure, a control indication method is provided, which is applicable to a base station. The method includes:

sending indication information to a terminal;

in which, the indication information is configured to instruct the terminal to control a non-wireless communication behavior corresponding to the indication information based on a control mode corresponding to the indication information.

According to a second aspect of the embodiments of the present disclosure, a behavior control method is provided, which is applicable to a terminal. The method includes:

receiving indication information;

determining a control mode and a non-wireless communication behavior corresponding to the indication information; and controlling the non-wireless communication behavior based on the control mode.

According to a third aspect of the embodiment of the present disclosure, a communication apparatus is provided, including:

a processor;

a memory configured to store instructions executable by the processor;

in which, the processor is configured to execute the control indication method and/or the behavior control method described above.

BRIEF DESCRIPTION OF THE DRAWINGS

To illustrate the solutions according to the embodiments of the present disclosure more clearly, accompanying drawings needed for describing the embodiments or the prior art are briefly introduced below. Obviously, the accompanying drawings in the following descriptions are merely some embodiments of the present disclosure, and persons of ordinary skill in the art may obtain other drawings according to the accompanying drawings without making creative efforts.

FIG. 1 is a flow chart illustrating a control indication method applicable to a base station according to an embodiment of the present disclosure.

FIG. 2 is a flow chart illustrating a control indication method according to another embodiment of the present disclosure.

FIG. 3 is a flow chart illustrating a control indication method according to a yet embodiment of the present disclosure.

FIG. 4 is a flow chart illustrating a behavior control method applicable to a terminal according to an embodiment of the present disclosure.

FIG. 5 is a flow chart illustrating a behavior control method according to another embodiment of the present disclosure.

FIG. 6 is a flow chart illustrating a behavior control method according to a yet another embodiment of the present disclosure.

FIG. 7 is a flow chart illustrating a behavior control method according to yet another embodiment of the present disclosure.

FIG. 8 is a flow chart illustrating a behavior control method according to a still further embodiment of the present disclosure.

FIG. 9 is a flow chart illustrating a behavior control method according to still another embodiment of the present disclosure.

FIG. 10 is a schematic block diagram illustrating a control indication apparatus applicable to a base station according to an embodiment of the present disclosure.

FIG. 11 is a schematic block diagram illustrating a control indication apparatus according to another embodiment of the present disclosure.

FIG. 12 is a schematic block diagram illustrating a control indication apparatus according to another embodiment of the present disclosure.

DETAILED DESCRIPTION

Figure 13:
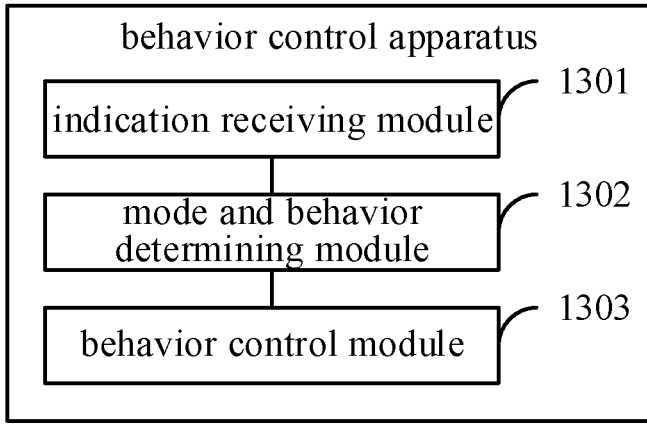
FIG. 13 is a schematic block diagram illustrating a behavior control apparatus applicable to a terminal according to an embodiment of the present disclosure.

The technical scheme in embodiments of the present disclosure will be described clearly and completely in combination with the appended drawings in embodiments of the present disclosure. It is obvious that the embodiments described are only a part of embodiments in the present disclosure, rather than the whole embodiments. On the basis of embodiments of the present disclosure, all other embodiments obtained by those skilled in the art without creative work are within the protection scope of the present disclosure.

FIG. 1 is a flow chart illustrating a control indication method according to an embodiment of the present disclosure. The control indication method shown in the embodiment may be applicable to a base station, and the base station includes, but is not limited to, a 4G base station, a 5G base station, a 6G base, or other base stations in a communication system. The base station may communicate with a terminal configured as a user equipment. The terminal includes, but is not limited to, a mobile phone, a tablet computer, a wearable device, a sensor, an Internet of Things device, and other communication apparatuses.

In an embodiment, the terminal may be a terminal to which a behavior control method according to any one of the following embodiments is applicable.

As illustrated in FIG. 1, the control indication method may include the following steps.

At step S101, indication information is sent to a terminal.

The indication information is configured to instruct the terminal to control a non-wireless communication behavior corresponding to the indication information based on a control mode corresponding to the indication information.

In an embodiment, the base station may send the indication information to the terminal, so as to instruct the terminal which receives the indication information via the indication information. Specifically, the indication information may instruct the terminal to control the non-wireless communication behavior corresponding to the indication information based on the control mode corresponding to the indication information.

In an embodiment, a behavior corresponding to the indication information may be further defined as a non-communication behavior. That is, the terminal controls the behavior other than a communication behavior based on the indication information.

In an embodiment, a mode of the base station sending the indication information to the terminal includes at least one of:

broadcast, groupcast, or unicast.

In an embodiment, the indication information may be system information.

In a case that the base station is a 4G base station, such as an evolved universal terrestrial radio access network (EUTRAN) base station, the indication information may be carried in a system information block SIB 1. In a case that the base station is a 5G base station, such as a new radio (NR) base station, the indication information may be carried in minimum system information (minimum SI). In both cases, the system information is broadcast, and the indication information may be sent to the terminal in a broadcast mode.

In addition, in the case that the base station is the 5G base station, a new system information block may be introduced into other system information (other SI) to carry the indication information. In this case, the system information is sent to the terminal on demand, which is equivalent to that the system information is sent to the terminal in a broadcast or unicast mode.

In an embodiment, after receiving the indication information, the terminal may determine the control mode corresponding to the indication information, and determine the non-wireless communication behavior corresponding to the indication information.

In an embodiment, there may be an association relationship between the indication information and the non-wireless communication behavior, referred to as a first association relationship. The first association relationship may be determined by a pre-negotiation between the base station and the terminal, or may be determined by the base station alone and sent to the terminal in advance. The first association relationship may also be stored by the base station in advance. For example, the first association relationship is specified by a communication protocol.

In an embodiment, there may be an association relationship between the indication information and the control mode, referred to as a second association relationship. The second association relationship may be determined by a pre-negotiation between the base station and the terminal, or may be determined by the base station alone and sent to the terminal in advance. The second association relationship may also be stored by the base station in advance. For example, the second association relationship is specified by the communication protocol.

It should be noted that, the expressions "in advance" and "pre-" defined in the foregoing embodiments may refer to "before the base station sends the indication information to the terminal".

In an embodiment, after receiving the indication information, the terminal may determine the non-wireless communication behavior (which may be one or more behaviors) corresponding to a value in the indication information based on the value in the indication information and the first association relationship, and determine the control mode corresponding to the value based on the value in the indication information and the second association relationship, and then control the determined non-wireless communication behavior based on the determined control mode. The type of the value in the indication information includes, but is not limited to, an integer type, an enumeration type, and a character string type.

In an embodiment, the non-wireless communication behavior includes at least one of: an audio output behavior, a display behavior, a prompt behavior, or a power supply behavior.

For different non-wireless communication behaviors, the control modes may be the same or different. Moreover, for different non-wireless communication behaviors, information of the corresponding control modes in the indication information may be the same, but may represent different meanings. For example, bits of the corresponding control mode in the indication information are 01. For the audio output behavior, the bits indicate that the control mode is turning output volume down. For the prompt behavior, the bits indicate that the control mode is adjusting to a vibrate mode.

For example, the non-wireless communication behavior is the audio output behavior, and the control mode may include one of: turning up, turning down, turning off, and adjusting to a non-loudspeaker mode. For the audio output behavior, turning up refers to turning the output volume up, turning down refers to turning the output volume down, turning off refers to silent, and adjusting to the non-loudspeaker mode refers to adjusting to an earphone output mode, in which if no earphone is connected, the audio cannot be output, and the audio is output by the earphone after the earphone (including a wireless earphone and a wired earphone) is connected.

For example, the non-wireless communication behavior is the display behavior (including, but not limited to, a behavior of displaying a screen such as images, videos and the like). The control mode may include one of the following: increasing, reducing and turning off. For the display behavior, increasing refers to increasing a display effect, reducing refers to reducing the display effect, and turning off refers to turning off the screen. The display effect includes, but is not limited to, one of: brightness, chroma, or contrast.

For example, the non-wireless communication behavior is the prompt behavior, and the control mode may include one of: adjusting to a ring mode, adjusting to the vibrate mode, adjusting to a silent mode, or adjusting to a vibrate and ring mode. For the prompt behavior, the prompt behavior may be adjusted to a corresponding mode based on the control mode. If the terminal is already in the corresponding mode, there is no need to adjust.

For example, the non-wireless communication behavior is the power supply behavior, the control mode may include one of: adjusting to a power saving mode or adjusting to a normal power supply mode. For the power supply behavior, the power supply behavior may be adjusted to the corresponding mode based on the control mode. If the terminal is already in the corresponding mode, there is no need to adjust.

According to the embodiments of the present disclosure, the base station sends the indication information to the terminal to control the non-wireless communication behavior of the terminal. Since the base station may communicate with terminals within a large range, for example, the base station sends the indication information to the terminals within a coverage range thereof in the broadcast mode, relatively comprehensive control on the non-wireless communication behavior of the terminal within the coverage range may be realized without a large amount of manual participations, which is beneficial to saving costs.

In some embodiment, the base station includes at least one of:

a subway base station, or a high-speed railway base station.

Take the subway base station as an example. Since the public transport such as subway has a relatively closed space, some behaviors (such as the audio is playing on speaker) of the terminal will have a great influence on other passengers in the subway. For such behavior, some cities (such as Shanghai and Suzhou) have prohibited it, but this prohibition relies on personal qualities of passengers on one hand. However, the personal qualities of the passengers are uneven, and not everyone can tacitly comply with the regulation. Therefore, on other hand, a certain degree of artificial monitoring is required, which increases labor costs. Also, some passengers do not have quality problems, but the passengers such as passengers who newly come to the city and take the subway, do not notice the prohibition icons and do not know which behaviors are prohibited, so manual reminders are required to get a desired effect.

A coverage of the subway base station includes subway lines. The indication information may be sent to the terminals of all passengers taking the subway via the subway base station. For example, the corresponding non-wireless communication behavior is the audio output behavior, and the corresponding control mode is turning off. After receiving the indication information, the terminal may be put on silent, so as to avoid the influence on other passengers. This process does not require artificial monitoring, which saves labor costs and does not cause omissions to some terminals, so that comprehensively and effectively control on the non-wireless communication behaviors of the terminals that are mainly prohibited in the subway can be realized.

In an embodiment, the indication information carries at least one of:

identification information of the non-wireless communication behavior, or type information of the base station.

The first association relationship is an association relationship between the identification information and the non-wireless communication behavior, the second association relationship is an association relationship between the identification information and the control mode. And/or the first association relationship is an association relationship between the type information and the non-wireless communication behavior, the second association relationship is an association relationship between the type information and the control mode.

In an embodiment, the indication information may carry the identification information of the non-wireless communication behavior that needs to be controlled. The terminal may determine the non-wireless communication behavior that needs to be controlled based on the first association relationship and the identification information, and determine the control mode based on the second association relationship and the identification information.

The base station may determine the non-wireless communication behavior that needs to be controlled based on requirements, and determine the identification information of the non-wireless communication behavior. Then the base station carries the identification information in the indication information and sends the indication information to the terminal, so as to instruct the terminal to control the non-wireless communication behavior by using the corresponding control mode.

In an embodiment, the indication information may carry the type information of the base station. The terminal may determine the non-wireless communication behavior that needs to be controlled based on the first association relationship and the type information, and determine the control mode based on the second association relationship and the type information.

For different types of base stations, the non-wireless communication behaviors that need to be controlled and the control modes may be different. In the indication information sent by the base station to the terminal, the type information of the base station that sends the indication information may be carried. The terminal may receive the indication information sent by different base stations within coverages of the different base stations, obtain types of the base stations from the indication information, and then determine the non-wireless communication behavior that needs to be controlled by the base station of one type and the control mode based on the type.

In an embodiment, the indication information also carries type information of a neighboring base station of the base station.

The indication information is further configured to instruct the terminal to determine the control mode and/or the non-wireless communication behavior corresponding to the indication information based on the type information of the neighboring base station when accessing the neighboring base station.

In an embodiment, for base stations of different types, the non-wireless communication behaviors that need to be controlled and the control modes may be different. The base station may obtain the type information of the neighboring base station, and then carry the type information of the neighboring base station in the indication information and send the indication information to the terminal. When the terminal accesses the neighboring base station (for example, resides in the neighboring base station or establishes a communication connection with the neighboring base station), the terminal may directly determine the non-wireless communication behavior that needs to be controlled by the neighboring base station and the corresponding control mode based on the obtained type information of the neighboring base station. Therefore, upon receiving the indication information sent by the neighboring base station, the terminal may adopt the corresponding control mode in time to control the non-wireless communication behavior.

In an embodiment, the indication information is further configured to indicate at least one of:

a control duration for the non-wireless communication behavior, or a control amplitude for the non-wireless communication behavior.

In an embodiment, in addition to indicating the non-wireless communication behavior that needs to be controlled and a corresponding control mode to the terminal via the indication information, the base station may further indicate a specific control duration, a control amplitude, and the like to the terminal via the indication information.

The control duration is a duration for controlling the non-wireless communication behavior by using the control mode. The control amplitude refers to an amplitude for controlling the non-wireless communication behavior by using the control mode.

For example, the non-wireless communication behavior is the audio output behavior, the control mode is turning down, the control duration is 20 minutes, and the control amplitude is 50%, then the terminal may turn volume of the audio output down by 50% for 20 minutes.

Accordingly, more accurate control on the terminal may be achieved, and user experience of the terminal may be improved.

FIG. 2 is a flow chart illustrating a control indication method according to another embodiment of the present disclosure. As illustrated in FIG. 2, in some embodiments, in response to the indication information being further configured to indicate the control duration, the method further includes step S201.

At step S201, the control duration is determined based on position information and/or historical path information of the terminal.

In an embodiment, the base station may determine the control duration based on the position information and/or the historical path information of the terminal. For example, the base station may predict how much time it will take for the terminal to leave the environment where the non-wireless communication behavior needs to be restricted based on the position information and/or the historical path information of the terminal, and determine the control duration based on the time.

Take the terminal moving in the subway as an example. For example, the historical path information of the terminal starts from station A, and sequentially passes through station B, station C, station D and arrives at station E. To simplify the description, it is assumed that lengths of AB, BC, CD and DE are equal and a total duration required by the subway to move from station A to station E is 40 minutes.

When the base station located near station D determines that the terminal moves from station A to station D by passing through station B and station C (for example, based on communications with other base stations passing by the terminal), the base station can determine that the terminate of the terminal is station E based on the historical path information of the terminal, that is, the terminal may leave a subway carriage after moving the distance DE by taking the subway, can determine that the duration for the terminal to move from station D to station E is 10 minutes, and can indicate the control duration which is 10 minutes to the terminal via the indication information.

For example, for controlling the audio output of the terminal, the terminal may be controlled to put on silent for 10 minutes from station D to station E. After 10 minutes, the terminal may disable the silent mode and output sound normally. Therefore, on the one hand, it can be ensured that the terminal keeps silent in the process that the terminal takes the subway from station D to station E, so as to avoid influence on other passengers. On the other hand, the duration of the terminal in the environment where the behavior needs to be restricted may be accurately determined. For example, after 10 minutes, it may be predicted that the terminal have left the subway carriage, and even if the terminal is still in the coverage range of the base station located near station D, the silent mode may be disabled, so as to avoid adverse effects on the user of the terminal.

It should be noted that, in order to determine the control duration more accurately, on the basis of considering the position information and/or the historical path information, time information may be further considered. For example, the historical path information corresponding to the terminal at the current time is determined, and then the above step is executed based on the determined historical path information.

FIG. 3 is a flow chart illustrating a control indication method according to a yet embodiment of the present disclosure. As illustrated in FIG. 3, in some embodiments, in response to the indication information being further configured to indicate the control amplitude, the method further includes step S301.

At step S301, the control amplitude is determined based on time information and/or position information of the terminal.

In an embodiment, the base station may determine the control amplitude based on the position information and the time information of the terminal. For example, a density of the passengers in the environment where the terminal is currently located may be predicted based on the position information and the time information of the terminal, and then the control amplitude is determined based on the density.

Take the terminal moving in the subway for which the audio output is controlled as an example. For example, the time information is 8 a.m., and the number of the passengers getting on and off the subway is large at the station where the terminal is located. It can be determined that the density of the passengers in the environment where the terminal is located is large, then the terminal may be controlled to turn volume down, and the amplitude of turning down is large. For example, the volume may be turned down to silent at most. For example, the time information is 10 p.m., and there are few passengers getting on and off at the station where the terminal is located. It can be determined that the density of the passengers in the environment where the terminal is located is small, the terminal may still be controlled to turn volume down, but the amplitude of turning down is small.

Therefore, on the one hand, it can be ensured that the volume of the terminal is not too large in the process of taking the subway, which avoids the influence on other passengers. On the other hand, the density of the passengers in the environment where the behavior needs to be restricted can be accurately determined. An adjusting amplitude of the volume is determined based on the density, so that the experience of a terminal user is prevented from being influenced by avoiding excessively turning the volume down under a condition that passengers are few or even no passenger exists.

FIG. 4 is a flow chart illustrating a behavior control method according to an embodiment of the present disclosure. The behavior control method shown in the embodiment may be applied to a terminal, and the terminal includes, but is not limited to, a mobile phone, a tablet computer, a wearable device, a sensor, an Internet of Things device, and other communication apparatuses. The terminal may be configured as a user equipment to communicate with a base station. The base station includes, but is not limited to, a base station in a communication system, such as a 4G base station, a 5G base station, a 6G base station, and the like.

In an embodiment, the base station may be a base station to which the control indication method described in any of the above embodiments is applicable.

As illustrated in FIG. 4, the behavior control method may include the following steps.

At step S401, indication information is received.

At step S402, a control mode and a non-wireless communication behavior corresponding to the indication information are determined.

At step S403, the non-wireless communication behavior is controlled based on the control mode.

In an embodiment, the base station may send the indication information to the terminal, so as to instruct the terminal which receives the indication information via the indication information, specifically, instructing the terminal to control the non-wireless communication behavior corresponding to the indication information based on the control mode corresponding to the indication information.

In an embodiment, a behavior corresponding to the indication information may be further defined as a non-communication behavior. That is, the terminal controls the behavior other than a communication behavior based on the indication information.

In an embodiment, a mode of the base station sending the indication information to the terminal includes at least one of:

broadcast, groupcast, or unicast.

In an embodiment, the indication information may be system information.

In a case that the base station is a 4G base station, such as an EUTRAN base station, the indication information may be carried in a system information block SIB 1. In a case that the base station is a 5G base station, such as an NR base station, the indication information may be carried in minimum SI. In both cases, the system information is broadcast, and the indication information may be sent to the terminal in a broadcast mode.

In addition, in the case that the base station is the 5G base station, a new system information block may be introduced into other system information (other SI) to carry the indication information. In this case, the system information is sent to the terminal on demand, which is equivalent to that the system information is sent to the terminal in a unicast mode.

In an embodiment, after receiving the indication information, the terminal may determine the control mode corresponding to the indication information, and determine the non-wireless communication behavior corresponding to the indication information.

In an embodiment, there may be an association relationship between the indication information and the non-wireless communication behavior, referred to as a first association relationship. The first association relationship may be determined by a pre-negotiation between the base station and the terminal, or may be determined by the base station alone and sent to the terminal in advance. The first association relationship may also be stored by the base station in advance. For example, the first association relationship is specified by a communication protocol.

In an embodiment, there may be an association relationship between the indication information and the control mode, referred to as a second association relationship. The second association relationship may be determined by a pre-negotiation between the base station and the terminal, or may be determined by the base station alone and sent to the terminal in advance. The second association relationship may also be stored by the base station in advance. For example, the second association relationship is specified by the communication protocol.

It should be noted that, the expressions "in advance" and "pre-" defined in the above embodiments may refer to "before the base station sends the indication information to the terminal".

In an embodiment, after receiving the indication information, the terminal may determine the non-wireless communication behavior (which may be one or more behaviors) corresponding to a value in the indication information based on the value in the indication information and the first association relationship, and determine the control mode corresponding to the value based on the value in the indication information and the second association relationship, and then control the determined non-wireless communication behavior based on the determined control mode. The type of the value in the indication information includes, but is not limited to, an integer type, an enumeration type, and a character string type.

In an embodiment, the non-wireless communication behavior includes at least one of: an audio output behavior, a display behavior, a prompt behavior, or a power supply behavior.

For different non-wireless communication behaviors, the control modes may be the same or different. Moreover, for different non-wireless communication behaviors, information of the corresponding control modes in the indication information may be the same, but may represent different meanings. For example, bits of the corresponding control mode in the indication information are 01, for the audio output behavior, the bits indicate that the control mode is turning output volume down, and for the prompt behavior, the bits indicate that the control mode is adjusting to a vibrate mode.

For example, the non-wireless communication behavior is the audio output behavior, and the control mode may include one of the following: turning up, turning down, turning off, and adjusting to a non-loudspeaker mode. For the audio output behavior, turning up refers to turning the output volume up, turning down refers to turning the output volume down, turning off refers to silent, and adjusting to the non-loudspeaker mode refers to adjusting to an earphone output mode, in which if no earphone is connected, the audio cannot be output, and after the earphone (including a wireless earphone and a wired earphone) is connected, the audio is output by the earphone.

For example, the non-wireless communication behavior is the display behavior (including, but not limited to, a behavior of displaying a screen such as an image, a video and the like). The control mode may include one of the following: increasing, reducing and turning off. For the display behavior, increasing refers to increasing a display effect, reducing refers to reducing the display effect, and turning off refers to turning off the screen. The display effect includes, but is not limited to, one of: brightness, chroma, or contrast.

For example, the non-wireless communication behavior is the prompt behavior, and the control mode may include one of: adjusting to a ring mode, adjusting to the vibrate mode, adjusting to a silent mode, or adjusting to a vibrate and ring mode. For the prompt behavior, the prompt behavior may be adjusted to a corresponding mode based on the control mode. If the terminal is already in the corresponding mode, there is no need to adjust.

For example, the non-wireless communication behavior is the power supply behavior, the control mode may include one of: adjusting to a power saving mode, adjusting to a normal power supply mode. For the power supply behavior, the power supply behavior may be adjusted to the corresponding mode based on the control mode. If the terminal is already in the corresponding mode, there is no need to adjust.

According to the embodiments of the present disclosure, the base station sends the indication information to the terminal to control the non-wireless communication behavior of the terminal. Since the base station may communicate with terminals within a large range, for example, the base station sends the indication information to the terminals within a coverage range thereof in the broadcast mode, relatively comprehensive control on the non-wireless communication behavior of the terminal within the coverage range may be realized without a large amount of manual participations, which is beneficial to saving costs.

In some embodiment, the base station includes at least one of:

a subway base station, or a high-speed railway base station.

Take the subway base station as an example. Since the public transport such as subway has a relatively closed space, some behaviors (such as the audio is playing on speaker) of the terminal will have a great influence on other passengers in the subway. For such behavior, some cities (such as Shanghai and Suzhou) have prohibited it, but this prohibition relies on personal qualities of passengers on one hand. However, the personal qualities of the passengers are uneven, and not everyone can tacitly comply with the regulation. Therefore, on other hand, a certain degree of artificial monitoring is required, which increases labor costs. Also, some passengers do not have quality problems, but the passengers such as passengers who newly come to the city and take the subway, do not notice the prohibition icons and do not know which behaviors are prohibited, so manual reminders are required to get a desired effect.

A coverage of the subway base station includes subway lines. The indication information may be sent to the terminals of all passengers taking the subway via the subway base station. For example, the corresponding non-wireless communication behavior is the audio output behavior, and the corresponding control mode is turning off. After receiving the indication information, the terminal may be put on silent, so as to avoid the influence on other passengers. This process does not require artificial monitoring, which saves labor costs and does not cause omissions to some terminals, so that comprehensively and effectively control on the non-wireless communication behaviors of the terminals that are mainly prohibited in the subway can be realized.

FIG. 5 is a flow chart illustrating a behavior control method according to another embodiment of the present disclosure. As illustrated in FIG. 5, in some embodiment, the indication information includes at least one of:

identification information of the non-wireless communication behavior, or type information of the base station.

The first association relationship is an association relationship between the identification information and the non-wireless communication behavior, the second association relationship is an association relationship between the identification information and the control mode, and/or the first association relationship is an association relationship between the type information and the non-wireless communication behavior, the second association relationship is an association relationship between the type information and the control mode.

Determining the control mode and the non-wireless communication behavior corresponding to the indication information includes step S501.

At step S501, the non-wireless communication behavior is determined based on the identification information and the first association relationship, and the control mode is determined based on the identification information and the second association relationship; and/or the non-wireless communication behavior is determined based on the type information and the first association relationship, and the control mode is determined based on the type information and the second association relationship.

In an embodiment, the indication information is from the base station. The indication information may carry the identification information of the non-wireless communication behavior that needs to be controlled. The terminal may determine the non-wireless communication behavior that needs to be controlled based on the first association relationship and the identification information, and determine the control mode based on the second association relationship and the identification information.

The base station may determine the non-wireless communication behavior that needs to be controlled based on requirements, determine the identification information of the non-wireless communication behavior. Then the base station carries the identification information in the indication information and sends the indication information to the terminal, so as to instruct the terminal to control the non-wireless communication behavior by using the corresponding control mode.

In an embodiment, the indication information is from the base station. The indication information may carry the type information of the base station. The terminal may determine the non-wireless communication behavior that needs to be controlled based on the first association relationship and the type information, and determine the control mode based on the second association relationship and the type information.

For base stations of different types, the non-wireless communication behaviors that need to be controlled and the control modes may be different. In the indication information sent by the base station to the terminal, the type information of the base station which sends the indication information may be carried. The terminal may receive the indication information sent by different base stations within the coverages of the different base stations, obtains types of the base stations from the indication information, and then determine the non-wireless communication behavior that needs to be controlled by the base station of one type and the control mode based on the type.

FIG. 6 is a flow chart illustrating a behavior control method according to a yet embodiment of the present disclosure. As illustrated in FIG. 6, in an embodiment, the indication information is from the base station. The indication information also carries type information of a neighboring base station of the base station. The method further includes step S601.

At step S601, the control mode and/or the non-wireless communication behavior corresponding to the indication information is determined based on the type information of the neighboring base station, when the neighboring base station is accessed.

In an embodiment, for base stations of different types, the non-wireless communication behaviors that need to be controlled and the control modes may be different. The base station may obtain the type information of the neighboring base station, and then carry the type information of the neighboring base station in the indication information and send the indication information to the terminal. When the terminal accesses the neighboring base station (for example, resides in the neighboring base station or establishes a communication connection with the neighboring base station), the terminal may directly determine the non-wireless communication behavior that needs to be controlled by the neighboring base station and the corresponding control mode based on the obtained type information of the neighboring base station. Therefore, upon receiving the indication information sent by the neighboring base station, the terminal may adopt the corresponding control mode in time to control the non-wireless communication behavior.

FIG. 7 is a flow chart illustrating a behavior control method according to yet another embodiment of the present disclosure. As illustrated in FIG. 7, in some embodiment, the method further includes step S701.

At step S701, at least one of the followings is determined based on the indication information:

a control duration for the non-wireless communication behavior or a control amplitude for the non-wireless communication behavior.

In an embodiment, in addition to indicating the non-wireless communication behavior that needs to be controlled and the corresponding control mode to the terminal via the indication information, the base station may further indicate the specific control duration, the control amplitude, and the like to the terminal via the indication information.

The control duration is a duration for controlling the non-wireless communication behavior by using the control mode. The control amplitude refers to an amplitude for controlling the non-wireless communication behavior by using the control mode.

For example, the non-wireless communication behavior is the audio output behavior, the control mode is turning down, the control duration is 20 minutes, and the control amplitude is 50%, then the terminal may turn volume of the audio output down by 50% for 20 minutes.

Accordingly, more accurate control on the terminal may be achieved, and the user experience of the terminal may be improved.

FIG. 8 is a flow chart illustrating a behavior control method for according to a still embodiment of the present disclosure. As illustrated in FIG. 8, in some embodiments, in response to determining the control duration based on the indication information, controlling the non-wireless communication behavior based on the control mode includes step S801.

At step S801, the non-wireless communication behavior is controlled within the control duration based on the control mode.

In an embodiment, the base station may determine the control duration based on position information and/or historical path information of the terminal. For example, the base station may predict how much time it will take for the terminal to leave the environment where the non-wireless communication behavior needs to be restricted based on the position information and/or the historical path information of the terminal, and then determine the control duration based on the time.

Take the terminal moving in the subway as an example. For example, the historical path information of the terminal starts from station A, and sequentially passes through station B, station C, station D and arrives at station E. To simplify the description, it is assumed that lengths of AB, BC, CD and DE are equal and a total duration required by the subway to move from station A to station E is 40 minutes.

When the base station located near station D determines that the terminal moves from station A to station D by passing through station B and station C (for example, based on communications with other base stations passing by the terminal), the base station can determine that the terminate of the terminal is station E based on the historical path information of the terminal, that is, the terminal may leave a subway carriage after moving the distance DE by taking the subway, can determine that the duration for the terminal to move from station D to station E is 10 minutes, and can indicate the control duration which is 10 minutes to the terminal via the indication information.

For example, for controlling the audio output of the terminal, the terminal may be controlled to put on silent for 10 minutes from station D to station E. After 10 minutes, the terminal may disable the silent mode and output sound normally. Therefore, on the one hand, it can be ensured that the terminal keeps silent in the process that the terminal takes the subway from station D to station E, so as to avoid influence on other passengers. On the other hand, the duration of the terminal in the environment where the behavior needs to be restricted may be accurately determined. For example, after 10 minutes, it may be predicted that the terminal have left the subway carriage, and even if the terminal is still in the coverage range of the base station located near station D, the silent mode may be disabled, so as to avoid adverse effects on the user of the terminal.

It should be noted that, in order to determine the control duration more accurately, on the basis of considering the position information and/or the historical path information, time information may be further considered. For example, the historical path information corresponding to the terminal at the current time is determined, and then the above step is executed based on the determined historical path information.

FIG. 9 is a flow chart illustrating a behavior control method according to still another embodiment of the present disclosure. As illustrated in FIG. 9, in some embodiments, in response to determining the control amplitude based on the indication information, controlling the non-wireless communication behavior based on the control mode includes step S901.

At step S901, the non-wireless communication behavior is controlled with the control amplitude based on the control mode.

In an embodiment, the base station may determine the control amplitude based on the position information and the time information of the terminal. For example, a density of the passengers in the environment where the terminal is currently located may be predicted based on the position information and the time information of the terminal, and then the control amplitude is determined based on the density.

Take the terminal moving in the subway for which the audio output is controlled as an example. For example, the time information is 8 a.m., and the number of the passengers getting on and off the subway is large at the station where the terminal is located. It can be determined that the density of the passengers in the environment where the terminal is located is large, then the terminal may be controlled to turn volume down, and the amplitude of turning down is large. For example, the volume may be turned down to silent at most. For example, the time information is 10 p.m., and there are few passengers getting on and off at the station where the terminal is located. It can be determined that the density of the passengers in the environment where the terminal is located is small, the terminal may still be controlled to turn volume down, but the amplitude of turning down is small.

Therefore, on the one hand, it can be ensured that the volume of the terminal is not too large in the process of taking the subway, which avoids the influence on other passengers. On the other hand, the density of the passengers in the environment where the behavior needs to be restricted can be accurately determined. An adjusting amplitude of the volume is determined based on the density, so that the experience of the terminal user is prevented from being influenced by avoiding excessively turning the volume down under a condition that passengers are few or even no passenger exists.

In one embodiment, the indication information is from the base station. The method further includes:

in response to leaving the base station, stopping controlling the non-wireless communication behavior based on the control mode.

In an embodiment, after the terminal leaves the base station, the control on the non-wireless communication behavior based on the control mode indicated by the base station may be stopped. For example, the non-wireless communication behavior is the audio playing behavior, and the control mode is putting on silent, then after the terminal leaves the base station, the normal playing of the audio may be recovered, and the terminal is no longer silent.

The terminal leaving the base station may refer to disconnecting a communication connection between the terminal and the base station, or may refer to that the terminal is switched from residing in the base station to residing in another base station, which may be set as required.

Corresponding to the above embodiments of the control indication method and the behavior control method, embodiments of a control indication apparatus and a behavior control apparatus are further provided in the present disclosure.

FIG. 10 is a schematic block diagram illustrating a control indication apparatus according to an embodiment of the present disclosure. The control indication apparatus shown in the embodiment may be applicable to a base station, and the base station includes, but is not limited to, a base station in a communication system, such as a 4G base station, a 5G base station, a 6G base station, and the like. The base station may communicate with a terminal that is a user equipment, and the terminal includes, but is not limited to, a mobile phone, a tablet computer, a wearable device, a sensor, an Internet of Things device, and other communication apparatuses.

As illustrated in FIG. 10, the control indication apparatus may include an indication sending module 1001.

The indication sending module 1001 is configured to send indication information to the terminal The indication information is configured to instruct the terminal to control a non-wireless communication behavior corresponding to the indication information based on a control mode corresponding to the indication information.

In an embodiment, a mode of sending the indication information to the terminal include at least one of:

broadcast, groupcast, or unicast.

In some embodiments, a first association relationship between the indication information and the non-wireless communication behavior is determined by a pre-negotiation between the base station and the terminal, or determined by the base station and sent to the terminal in advance;

and/or a first association relationship between the indication information and the control mode is determined by a pre-negotiation between the base station and the terminal, or determined by the base station and sent to the terminal in advance.

In some embodiments, the indication information carries at least one of:

identification information of the non-wireless communication behavior, or type information of the base station.

The first association relationship is an association relationship between the identification information and the non-wireless communication behavior, the second association relationship is an association relationship between the identification information and the control mode; and/or the second association relationship is an association relationship between the type information and the non-wireless communication behavior, the second association relationship is an association relationship between the type information and the control mode.

In some embodiments, the indication information also carries type information of a neighboring base station of the base station.

The indication information is further configured to instruct the terminal to determine the control mode and/or the non-wireless communication behavior corresponding to the indication information based on the type information of the neighboring base station when accessing the neighboring base station.

In some embodiment, the base station includes at least one of:

a subway base station, or a high-speed railway base station.

In some embodiment, the non-wireless communication behavior includes at least one of:

an audio output behavior, a display behavior, a prompt behavior, or a power supply behavior.

In an embodiment, the indication information is further configured to indicate at least one of:

a control duration for the non-wireless communication behavior or a control amplitude for the non-wireless communication behavior.

FIG. 11 is a schematic block diagram illustrating a control indication apparatus according to another embodiment of the present disclosure. As illustrated in FIG. 11, in response to the indication information being further configured to indicate the control duration, the apparatus further includes a duration determining module 1101.

The duration determining module 1101 is configured to determine the control duration based on position information and/or historical path information of the terminal.

FIG. 12 is a schematic block diagram illustrating a control indication apparatus according to a yet embodiment of the present disclosure. As illustrated in FIG. 12, in response to the indication information being further configured to indicate the control amplitude, the apparatus further includes an amplitude determining module 1201.

The amplitude determining module 1201 is configured to determine the control amplitude based on time information and/or position information of the terminal.

FIG. 13 is a schematic block diagram illustrating a behavior control apparatus according to an embodiment of the present disclosure. The behavior control apparatus shown in the embodiment may be applied to a terminal, and the terminal includes, but is not limited to, a mobile phone, a tablet computer, a wearable device, a sensor, an Internet of Things device, and other communication apparatuses. The terminal may be configured as a user equipment to communicate with a base station. The base station includes, but is not limited to, a base station in a communication system, such as a 4G base station, a 5G base station, a 6G base station, and the like.

As illustrated in FIG. 13, the behavior control apparatus may include an indication receiving module 1301, a mode and behavior determining module 1302 and a behavior control module 1303.

The indication receiving module 1301 is configured to receive indication information.

The mode and behavior determining module 1302 is configured to determine a control mode and a non-wireless communication behavior corresponding to the indication information.

The behavior control module 1303 is configured to control the non-wireless communication behavior based on the control mode.

In some embodiments, a first association relationship between the indication information and the non-wireless communication behavior is determined by a pre-negotiation between the base station and the terminal, or determined by the base station and sent to the terminal in advance;

and/or a first association relationship between the indication information and the control mode is determined by a pre-negotiation between the base station and the terminal, or determined by the base station and sent to the terminal in advance.

In some embodiment, the indication information includes at least one of:

identification information of the non-wireless communication behavior, or type information of the base station.

The first association relationship is an association relationship between the identification information and the non-wireless communication behavior, the second association relationship is an association relationship between the identification information and the control mode; and/or the second association relationship is an association relationship between the type information and the non-wireless communication behavior, the second association relationship is an association relationship between the type information and the control mode.

The mode and behavior determining module is configured to determine the non-wireless communication behavior based on the identification information and the first association relationship, and determine the control mode based on the identification information and the second association relationship;

and/or determine the non-wireless communication behavior based on the type information and the first association relationship, and determine the control mode based on the type information and the second association relationship.

In some embodiments, the indication information further carries type information of a neighboring base station of the base station. The mode and behavior determining module is further configured to determine the control mode and/or the non-wireless communication behavior corresponding to the indication information based on the type information of the neighboring base station when accessing the neighboring base station.

In some embodiment, the base station includes at least one of:

a subway base station or a high-speed railway base station.

In some embodiment, the non-wireless communication behavior includes at least one of:

an audio output behavior, a display behavior, a prompt behavior, or a power supply behavior.

Figure 14:
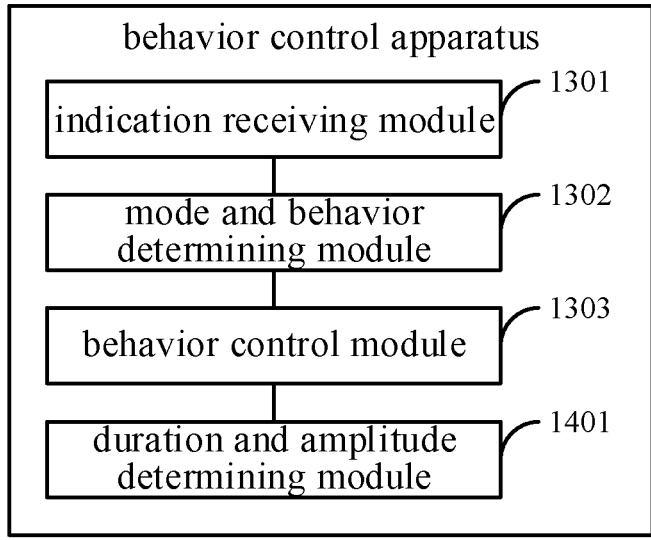
FIG. 14 is a schematic block diagram illustrating a behavior control apparatus according to another embodiment of the present disclosure.

FIG. 14 is a schematic block diagram illustrating a behavior control apparatus according to another embodiment of the present disclosure. As illustrated in FIG. 14, the apparatus further includes a duration and amplitude determining module 1401.

The duration and amplitude determining module 1401 is configured to determine at least one of the followings:

a control duration for the non-wireless communication behavior or a control amplitude for the non-wireless communication behavior based on the indication information.

In some embodiments, in response to determining the control duration based on the indication information, the behavior control module is configured to control the non-wireless communication behavior within the control duration based on the control mode.

In some embodiments, in response to determining the control amplitude based on the indication information, the behavior control module is configured to control the non-wireless communication behavior with the control amplitude based on the control mode.

In some embodiments, the behavior control module is configured to stop controlling the non-wireless communication behavior based on the control mode, in response to leaving the base station.

With respect to the apparatus in the above embodiments, the specific manners for performing operations of individual modules therein have been described in detail in the embodiments regarding the methods, which will not be elaborated herein.

For the apparatus embodiment, reference can be made to descriptions of the related part of the method embodiment since the apparatus embodiment corresponds to the method embodiment. The apparatus embodiments described above are only schematic. The modules illustrated as separate components can be or not be separated physically, and components described as modules can be or not be physical modules, i.e., can be located at one place, or can be distributed onto multiple network modules. It is possible to select some or all of the modules according to actual needs, for realizing the objective of embodiments of the present disclosure. Those skilled in the art may understand and implement the present disclosure without making any creative effort.

A communication apparatus is provided in the present disclosure, and includes:

a processor;

a memory configured to store a computer program;

when the computer program is executed by the processor, the control indication method according to any one of the above embodiments, and/or the behavior control method according to any one of the above embodiments is implemented.

A computer readable storage medium configured to store a computer program is provided. When the computer program is executed by the processor, the control indication method according to any one of the above embodiments, and/or the behavior control method according to any one of the above embodiments is implemented.

Figure 15:
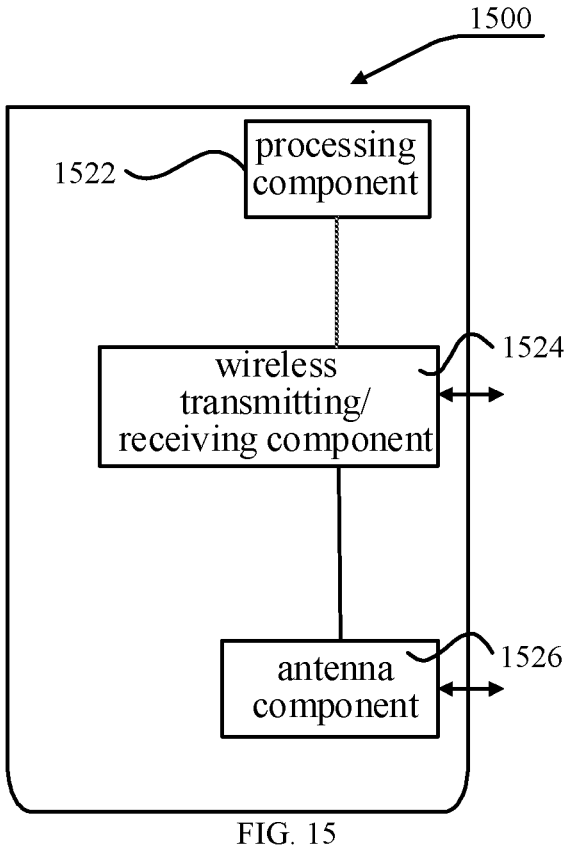
FIG. 15 is a schematic block diagram illustrating an apparatus for control indication according to an embodiment of the present disclosure.

As illustrated in FIG. 15, FIG. 15 is a schematic block diagram illustrating an apparatus 1500 configured for control indication according to an embodiment of the present disclosure. The apparatus 1500 can be provided as a base station. Referring to FIG. 15, the apparatus 1500 includes a processing component 1522, a wireless transmitting/receiving component 1524, an antenna component 1526, and a signal processing unit peculiar to a wireless interface, and the processing component 1522 may further include one or more processors. One processor of the processing component 1522 may be configured to implement any of the control indication methods according to any one of the above embodiments.

Figure 16:
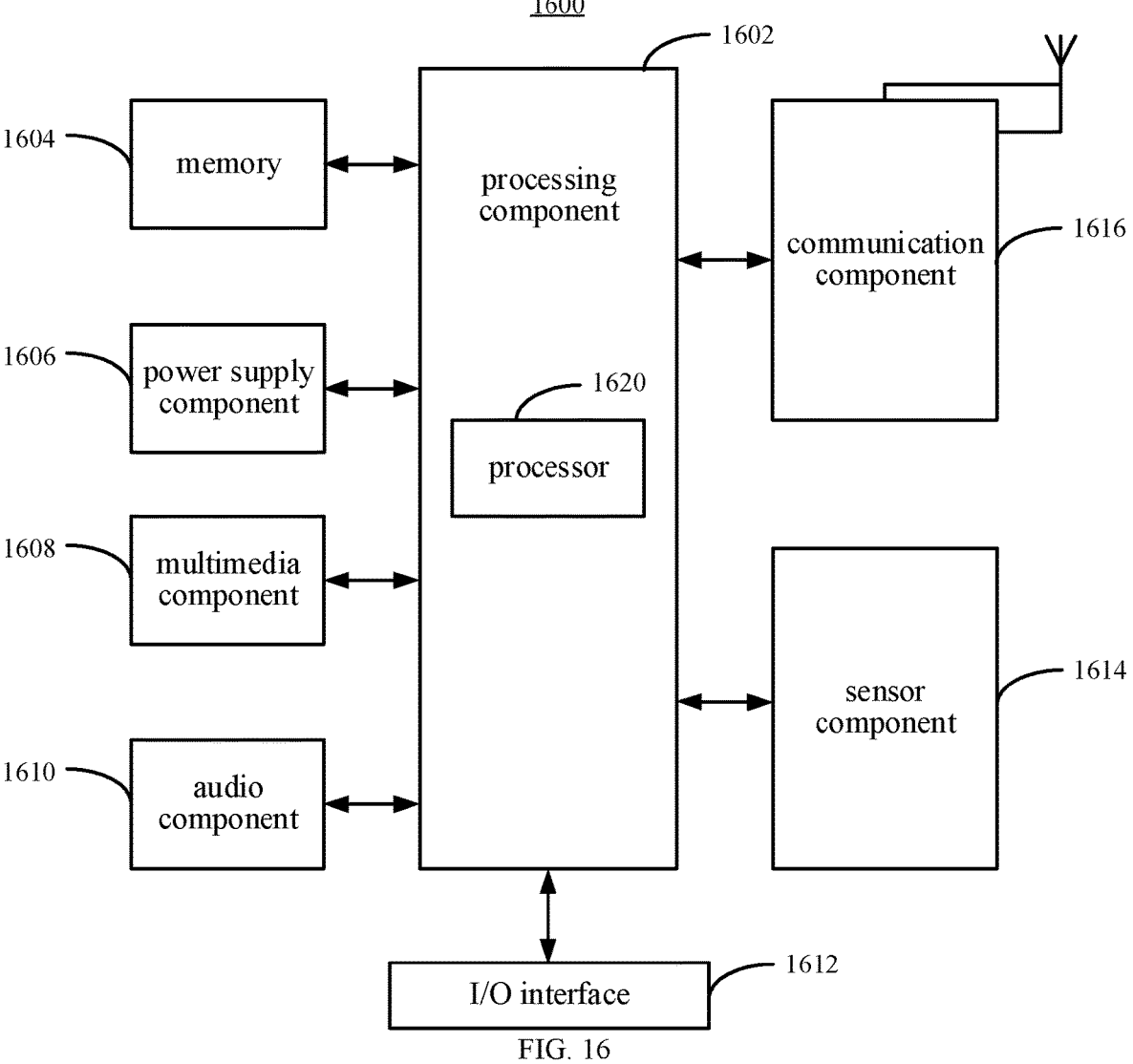
FIG. 16 is a schematic block diagram illustrating an apparatus for behavior control according to an embodiment of the present disclosure.

FIG. 16 is a schematic block diagram illustrating an apparatus 1600 configured for behavior control according to an embodiment of the present disclosure. For example, the apparatus 1600 may be a mobile phone, a computer, a digital broadcasting terminal, a messaging device, a game console, a tablet device, a medical equipment, a fitness equipment, a personal digital assistant, etc.

Referring to FIG. 16, the apparatus 1600 may include one or more components: a processing component 1602, a memory 1604, a power supply component 1606, a multimedia component 1608, an audio component 1610, an input/output (I/O) interface 1612, a sensor component 1614, and a communication component 1616.

The processing component 1602 generally controls overall operations of the apparatus 1600, such as the operations related to display, phone call, data communication, camera operation and recording operation. The processing component 1602 may include one or more processors 1620 to perform instructions, to complete all or part of steps of the above behavior control method. In addition, the processing component 1602 may include one or more modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operation of the apparatus 1600. Examples of the data include the instructions of any applications or methods operated on the apparatus 1600, contact data, phone book data, messages, pictures, videos, etc. The memory 1604 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1606 may provide power supply for all components of the apparatus 1600. The power supply component 1606 may include power supply management system, one or more power supplies, and other units related to generating, managing and distributing power for the apparatus 1600.

The multimedia component 1608 includes an output interface screen provided between the apparatus 1600 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 1608 includes a front camera and/or a rear camera. When the apparatus 1600 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1610 is configured as an output and/or input signal. For example, the audio component 1610 includes a microphone (MIC). When the apparatus 1600 is in operation mode, such as call mode, record mode, and speech recognition mode, the microphone is configured to receive the external audio signals. The audio signals received may be further stored in the memory 1604 or sent via the communication component 1616. In some embodiments, the audio component 1610 further includes a speaker configured to output an audio signal.

The I/O interface 1612 provides an interface for the processing component 1602 and the peripheral interface module, and the peripheral interface module may be a keyboard, a click wheel, a button, etc. The buttons may include but not limited to a home button, a volume button, a start button and a lock button.

The sensor component 1614 includes one or more sensors, configured to provide various aspects of status assessment for the apparatus 1600. For example, the sensor component 1614 may detect the on/off state of the apparatus 1600 and the relative positioning of the component. For example, the component is a display and a keypad of the apparatus 1600. The sensor component 1614 may further detect the location change of the apparatus 1600 or one component of the apparatus 1600, the presence or absence of contact between the user and the apparatus 1600, the orientation or acceleration/deceleration of the apparatus 1600, and the temperature change of the apparatus 1600. The sensor component 1614 may include a proximity sensor, which is configured to detect the existence of the objects nearby without any physical contact. The sensor component 1614 may further include a light sensor such as CMOS or CCD image sensor, which is configured to use in imaging applications. In some embodiments, the sensor component 1614 may further include an acceleration transducer, a gyroscope sensor, a magnetic sensor, a pressure sensor or a temperature sensor.

The communication component 1616 is configured for the convenience of wire or wireless communication between the apparatus 1600 and other devices. The apparatus 1600 may access wireless networks based on communication standard, such as WiFi, 2G or 3G, 4G LTE, 5G NR or their combination. In an exemplary embodiment, the communication component 1616 receives broadcast signals or broadcast-related information from an external broadcast management system via a broadcast channel. In an exemplary embodiment, the communication component 1616 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an exemplary embodiment, the apparatus 1600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method for behavior control.

In an example embodiment, a non-temporary computer readable storage medium is further provided which includes instructions, such as the memory 1604 including instructions. The instructions may be executed by the processor 1620 of the apparatus 1600 to complete the above methods for behavior control. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

It should be noted that relational terms such as first and second are used herein to distinguish one entity or operation from another entity or operation without necessarily requiring or implying any such actual relationship or order between such entities or operations. The terms "comprise", "comprising" or any other variations thereof, are intended to cover a non-exclusive inclusion, such that a process, method, an article or a device including a series of elements not only includes those elements but also includes other elements not expressly listed, or may further include elements inherent to such process, method, article, or device. In the absence of more constraints, the elements defined by a sentence "comprising one" do not preclude the presence of additional same elements in the process, method, article, or apparatus that includes the elements.

The above are detailed descriptions of embodiments of the present disclosure. Specific examples are applied to elaborate principles and implementations of the present disclosure. The descriptions of the above embodiments are only configured to help understand the method and core concepts of the present disclosure; at the same time, for those skilled in the art, there may be changes in the specific implementation and application scope according to the idea of the present disclosure. In summary, the contents of the summary should not be construed as a limitation of the present disclosure.

The invention claimed is:

1. A control indication method, performed by a base station, comprising:

sending indication information to a terminal;

wherein, the indication information is configured to instruct the terminal to control a non-wireless communication behavior corresponding to the indication information based on a control mode corresponding to the indication information;

wherein the indication information is further configured to indicate a control amplitude of the non-wireless communication behavior, the method further comprises:

predicting, based on position information and time information of the terminal, a density of passengers in an environment where the terminal is currently located; and determining the control amplitude based on the density of the passengers.

2. The method of claim 1, wherein a mode of sending the indication information to the terminal comprises at least one of:

broadcast, groupcast, or unicast.

3. The method of claim 1, wherein, a first association relationship between the indication information and the non-wireless communication behavior is determined by a pre-negotiation between the base station and the terminal, or determined by the base station and sent to the terminal in advance;

a second association relationship between the indication information and the control mode is determined by a pre-negotiation between the base station and the terminal, or determined by the base station and sent to the terminal in advance;

or a first association relationship between the indication information and the non-wireless communication behavior is determined by a pre-negotiation between the base station and the terminal, or determined by the base station and sent to the terminal in advance; and a second association relationship between the indication information and the control mode is determined by a pre-negotiation between the base station and the terminal, or determined by the base station and sent to the terminal in advance.

4. The method of claim 3, wherein the indication information carries at least one of:

identification information of the non-wireless communication behavior, or type information of the base station;

wherein, the first association relationship is an association relationship between the identification information and the non-wireless communication behavior, the second association relationship is an association relationship between the identification information and the control mode;

the first association relationship is an association relationship between the type information and the non-wireless communication behavior, the second association relationship is an association relationship between the type information and the control mode; or the first association relationship includes an association relationship between the type information and the non-wireless communication behavior, and an association relationship between the type information and the non-wireless communication behavior; the second association relationship includes an association relationship between the type information and the control mode, and an association relationship between the type information and the control mode.

5. The method of claim 1, wherein the indication information further carries type information of a neighboring base station of the base station;

wherein, the indication information is further configured to instruct the terminal to determine at least one of the control mode or the non-wireless communication behavior corresponding to the indication information based on the type information of the neighboring base station when accessing the neighboring base station.

6. The method of claim 1, wherein the base station comprises at least one of:

a subway base station, or a high-speed railway base station.

7. The method of claim 1, wherein the non-wireless communication behavior comprises at least one of:

an audio output behavior, a display behavior, a prompt behavior, or a power supply behavior.

8. The method of claim 1, wherein, the indication information is further configured to indicate:

a control duration for the non-wireless communication behavior.

9. The method of claim 8, wherein the indication information indicates the control duration, the method further comprises:

determining the control duration based on at least one of position information or historical path information of the terminal.

10. A behavior control method, performed by a terminal, comprising:

receiving indication information;

determining a control mode and a non-wireless communication behavior corresponding to the indication information; and controlling the non-wireless communication behavior based on the control mode; and determining a control amplitude for the non-wireless communication behavior based on the indication information;

wherein controlling the non-wireless communication behavior based on the control mode comprises:

controlling the non-wireless communication behavior with the control amplitude based on the control mode, wherein the control amplitude is determined based on a density of passengers in an environment where the terminal is currently located, and the density of the passengers is predicted based on position information and time information of the terminal.

11. The method of claim 10, wherein, a first association relationship between the indication information and the non-wireless communication behavior is determined by a pre-negotiation between a base station and the terminal, or determined by a base station and sent to the terminal in advance;

a second association relationship between the indication information and the control mode is determined by a pre-negotiation between a base station and the terminal, or determined by a base station and sent to the terminal in advance;

or a first association relationship between the indication information and the non-wireless communication behavior is determined by a pre-negotiation between a base station and the terminal, or determined by a base station and sent to the terminal in advance; and a second association relationship between the indication information and the control mode is determined by a pre-negotiation between a base station and the terminal, or determined by a base station and sent to the terminal in advance.

12. The method of claim 11, wherein the indication information comprises at least one of:

identification information of the non-wireless communication behavior, or type information of the base station;

wherein, the first association relationship is an association relationship between the identification information and the non-wireless communication behavior, the second association relationship is an association relationship between the identification information and the control mode;

the first association relationship is an association relationship between the type information and the non-wireless communication behavior, the second association relationship is an association relationship between the type information and the control mode; or the first association relationship includes an association relationship between the identification information and the non-wireless communication behavior, and an association relationship between the type information and the non-wireless communication behavior; the second association relationship includes an association relationship between the identification information and the control mode and an association relationship between the type information and the control mode;

wherein, determining the control mode and the non-wireless communication behavior corresponding to the indication information comprises at least one of the followings:

determining the non-wireless communication behavior based on the identification information and the first association relationship, and determining the control mode based on the identification information and the second association relationship; or determining the non-wireless communication behavior based on the type information and the first association relationship, and determining the control mode based on the type information and the second association relationship.

13. The method of claim 10, wherein the indication information is from a base station, the indication information further carries type information of a neighboring base station of the base station; and the method further comprises:

determining at least one of the control mode or the non-wireless communication behavior corresponding to the indication information based on the type information of the neighboring base station when accessing the neighboring base station.

14. The method of claim 10, wherein, the indication information is from a base station, and the base station comprises at least one of:

a subway base station, or a high-speed railway base station.

15. The method of any claim 10, further comprising:

determining a control duration for the non-wireless communication behavior based on the indication information.

16. The method of claim 15, wherein, the control duration is determined based on the indication information, controlling the non-wireless communication behavior based on the control mode comprises:

controlling the non-wireless communication behavior within the control duration based on the control mode.

17. A base station, comprising:

a processor;

a memory configured to store a computer program;

wherein, when the computer program is executed by the processor, the processor is configured to perform the following:

sending indication information to a terminal;

wherein, the indication information is configured to instruct the terminal to control a non-wireless communication behavior corresponding to the indication information based on a control mode corresponding to the indication information;

wherein the indication information is further configured to indicate a control amplitude of the non-wireless communication behavior, the processor is further configured to perform:

predicting, based on position information and time information of the terminal, a density of passengers in an environment where the terminal is currently located; and determining the control amplitude based on the density of the passengers.

18. A terminal, comprising:

a processor; and a memory configured to store a computer program;

wherein, when the computer program is executed by the processor, the behavior control method of claim 10 is implemented.

\* \* \* \* \*